(12) United States Patent
Ito et al.

(10) Patent No.: US 8,940,422 B2
(45) Date of Patent: Jan. 27, 2015

(54) SEALED BATTERY

(75) Inventors: Masanori Ito, Toyohashi (JP);
Tomohiro Matsuura, Toyota (JP);
Toyohiko Eto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 998 days.

(21) Appl. No.: 11/885,252

(22) PCT Filed: Mar. 16, 2006

(86) PCT No.: PCT/JP2006/305768
§ 371 (c)(1),
(2), (4) Date: Aug. 29, 2007

(87) PCT Pub. No.: WO2006/098508
PCT Pub. Date: Sep. 21, 2006

(65) Prior Publication Data
US 2008/0199763 A1    Aug. 21, 2008

(30) Foreign Application Priority Data

Mar. 18, 2005   (JP) ................................ 2005-080187

(51) Int. Cl.
*H01M 2/12*   (2006.01)

(52) U.S. Cl.
USPC ....................................................... 429/54

(58) Field of Classification Search
CPC ..... H01M 2/345; H01M 2/1229; H01M 2/12; H01M 2/1223; H01M 2/34; H01M 2/0413
USPC .................. 429/53, 54, 55, 56, 179
See application file for complete search history.

(56) References Cited

U.S. PATENT DOCUMENTS

| 3,484,301 | A | * | 12/1969 | Gray | 429/54 |
| 5,586,993 | A | * | 12/1996 | Saito et al. | 29/623.2 |
| 5,912,090 | A |   | 6/1999 | Nagai et al. | |
| 6,027,831 | A | * | 2/2000 | Inoue et al. | 429/181 |

FOREIGN PATENT DOCUMENTS

| JP | B 48-018294 | 6/1973 |
| JP | U 58-021956 | 2/1983 |
| JP | A 03-159057 | 7/1991 |
| JP | U 04-046358 | 4/1992 |
| JP | A 05-198291 | 8/1993 |
| JP | A 07-335190 | 12/1995 |
| JP | A 2003-197483 | 7/2003 |

\* cited by examiner

*Primary Examiner* — Ula C. Ruddock
*Assistant Examiner* — Thomas H. Parsons
(74) *Attorney, Agent, or Firm* — Oliff PLC

(57) ABSTRACT

A battery cell includes a battery housing case formed with a through hole communicating with an interior space, a hollow rivet, and a seal rubber. The hollow rivet has a seal surface annularly extending outside the battery housing case, and a hollow portion formed with an exhaust port continuous to the inner edge of the seal surface and positioned at the through hole to allow gas in the interior space to flow out through the exhaust port. The seal rubber has a contact unit extending annularly facing the seal surface to press the seal surface and is provided so as to close the exhaust port. The contact unit is formed to project toward the seal surface so as to contact the seal surface at a position away from the inner edge of the seal surface. Such an arrangement prevents an electrolyte leakage over a long period of time.

4 Claims, 5 Drawing Sheets

SEALED BATTERY

TECHNICAL FIELD

The present invention generally relates to a sealed battery and more particularly to a sealed battery having an alkaline electrolyte arranged therein.

BACKGROUND ART

As for conventional sealed batteries, for example, Japanese Patent Laying-Open No. 05-198291 discloses an alkaline sealed battery for the purpose of ensuring long-term reliability for a leak of electrolyte.

The alkaline sealed battery disclosed in Japanese Patent Laying-Open No. 05-198291 contains a restoration-type exhaust mechanism. The exhaust mechanism is comprised of a hollow rivet, a cap terminal spot-welded to an upper end portion of the hollow rivet, and an elastic valve body housed in a pressurized state in a space formed between the hollow rivet and the cap terminal. The hollow rivet is riveted to a metal cover plate together with a washer spot-welded to a positive lead of a battery element. With such a construction, a positive potential of the battery is applied to the hollow rivet.

Furthermore, Japanese Patent Laying-Open No. 03-159057 discloses a safety valve apparatus of a sealed alkaline storage battery for the purpose of achieving a valve operation performance stable for a long time under a wide range of temperatures. In Japanese Patent Laying-Open No. 03-159057, an elastic valve body is provided to close an exhaust port formed in a sealing plate. Furthermore, Japanese Utility Model Laying-Open No. 04-046358 discloses a safety valve apparatus of a battery with high operation accuracy with a simple construction for the purpose of preventing erroneous breakage of a thin film forming the safety valve. A safety valve apparatus disclosed in Japanese Utility Model Laying-Open No. 04-046358 includes a cover plate provided with a valve opening and a thin film heat-welded to the cover plate to enclose the valve opening.

In the alkaline sealed battery disclosed in the aforementioned Japanese Patent Laying-Open No. 05-198291, a bottom surface of the elastic valve body is formed to be flat, and the elastic valve body is provided such that the bottom surface thereof closes the opening of the hollow rivet. However, in this case, the bottom surface of the elastic valve body is pressed against an inner edge of the hollow rivet which defines the opening, so that stress concentration occurs in the elastic valve body. Then, if such a state continues for a long time, it is likely that a crack takes place in the elastic valve body and the electrolyte leaks from the location where the crack takes place.

DISCLOSURE OF THE INVENTION

An object of the present invention is to solve the aforementioned problem and to provide a sealed battery in which a leakage of an electrolyte is prevented over a long time.

A sealed battery in accordance with one aspect of the present invention includes: a case body forming an interior space in which an electrolyte is arranged and having a through-hole formed therein to communicate with the interior space; a hollow rivet; and an elastic valve body. The hollow rivet has a seal surface extending annularly outside the case body, and a hollow portion having an exhaust port formed therein to be continuous with an inner edge of the seal surface and being positioned to the through-hole, to allow gas in the interior space to flow out of the exhaust port. The elastic valve body has an abutment portion extending annularly facing the seal surface to pressurize the seal surface and is provided to close the exhaust port. The abutment portion is formed to protrude toward the seal surface so as to be in contact with the seal surface at a position away from the inner edge of the seal surface.

According to the sealed battery configured in this manner, the abutment portion does not pressurize the seal surface in such a state in that it is in contact with the inner edge of the seal surface which is continuous with the exhaust port. Thus, stress concentration at the contact position between the seal surface and the abutment portion can be prevented, thereby preventing degradation of the elastic valve body. Therefore, in accordance with the present invention, the seal between the seal surface and the abutment portion can be ensured thereby preventing a leakage of the electrolyte from the interior space over a long time.

Preferably, if cut across a plane orthogonal to a direction in which the abutment portion extends annularly, the abutment portion has a profile rounded at a position facing the seal surface. According to the sealed battery configured in this manner, the abutment portion can pressurize the seal surface such that uniform surface pressure acts on the contact position between the abutment portion and the seal surface. Thus, degradation of the elastic valve body can be prevented even more effectively.

The electrolyte is an alkaline electrolyte. Preferably, the hollow rivet is provided floated from a battery potential. According to the sealed battery configured in this manner, when the electrolyte is an alkaline electrolyte, the driving force of the electrolyte passing along the surface of the hollow rivet toward the contact position between the abutment portion and the seal surface can be reduced. Thus, a leakage of the electrolyte can be reduced even more effectively, thereby preventing salting.

A sealed battery in accordance with another aspect of the present invention includes a case body, an elastic valve body, and a cap body. The case body forms an interior space in which an electrolyte is arranged and has a through-hole formed therein to communicate with the interior space. The case body allows gas in the interior space to flow out through the through-hole. The elastic valve body is provided to close the through-hole. The cap body is fixed to the case body to compress and deform the elastic valve body toward the case body. The case body has a surface through which the through-hole is opened. The elastic valve body has a bottom surface opposing the through-hole with a gap, and a convex surface protruding from a peripheral edge of the bottom surface toward the surface. The convex surface pressurizes the surface at a position away from an opening edge of the through-hole.

According to the sealed battery configured in this manner, a state in which the elastic valve body is in contact with the case body at a position away from the opening edge of the through-hole is obtained by providing the elastic valve body with a bottom surface opposing the through-hole with a gap. Thus, stress concentration on the elastic valve body can be prevented, thereby preventing degradation of the elastic valve body. Therefore, in accordance with the present invention, the sealability by the elastic valve body is ensured to prevent a leakage of the electrolyte from the interior space over a long time.

Preferably, the convex surface has a profile rounded at a position facing the surface. According to the sealed battery configured in this manner, when the convex surface pressurizes the surface, surface pressure can be applied to the convex surface more uniformly. Thus, degradation of the elastic valve body can be prevented even more effectively.

Preferably, the sealed battery further includes a hollow rivet inserted in the through-hole and having an exhaust port formed therein to allow gas in the interior space to flow out. The hollow rivet has a seal surface extending on the surface and having the exhaust port opened thereto. The convex surface pressurizes the seal surface at a position away from an opening edge of the exhaust port. The sealed battery configured in this manner prevents the convex surface from being in contact with the opening edge of the exhaust port, thereby preventing stress concentration on the elastic valve body.

As described above, in accordance with the present invention, it is possible to provide a sealed battery in which a leakage of an electrolyte is prevented over a long time.

BEST MODES FOR CARRYING OUT THE INVENTION

Figure 1:
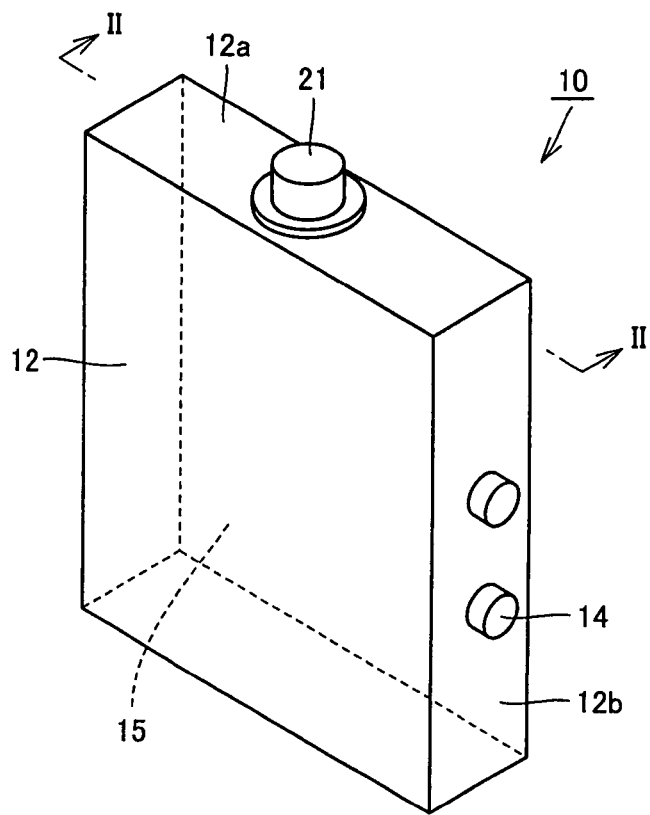
FIG. 1 is a perspective view showing a battery cell in a first embodiment of this invention.

The embodiments of this invention will be described with reference to the figures. It is noted that in the drawings referred to below, the same or corresponding members will be denoted with the same numerals.

First Embodiment

FIG. 1 is a perspective view showing a battery cell in a first embodiment of the present invention. A plurality of battery cells shown in the figure are combined in series and mounted on a hybrid car. The battery cell serves as a power source together with an internal combustion engine such as a gasoline engine or a diesel engine in the hybrid car.

Referring to FIG. 1, a battery cell 10 is a nickel metal hydride battery and is formed to be covered with a battery housing case 12. Battery housing case 12 has a sealed, approximately rectangular parallelepiped-shaped casing structure and is formed of a chemically and physically stable metal. In an interior space 15 formed by battery housing case 12, a positive electrode including a nickel oxide or a nickel hydroxide and a negative electrode including a hydrogen-absorbing alloy are housed. The positive electrode and the negative electrode are multi-layered with a separator interposed therebetween in a state of being soaked in an electrolyte. The electrolyte is made of an alkaline aqueous solution of potassium hydroxide, sodium hydroxide, lithium hydroxide, or the like.

The positive electrode protrudes from a side surface 12b of battery housing case 12 and is connected to a positive terminal 14 provided in non-contact with battery housing case 12. The negative electrode is connected to battery housing case 12 in interior space 15, and a negative terminal is formed of battery housing case 12. The positive terminal and the negative terminal are not limited to such a manner. For example, a positive terminal may be formed of battery housing case 12 or both of a positive terminal and a negative terminal may be provided separately from battery housing case 12.

Battery housing case 12 has a surface 12a forming a face of battery housing case 12 at a position different from side surface 12b. A cap 21 is attached by spot welding on surface 12a. Inside cap 21, an exhaust mechanism is provided for discharging hydrogen or oxygen produced in interior space 15 to the outside. It is noted that a gas discharge port is formed at cap 21, although not shown.

Figure 2:
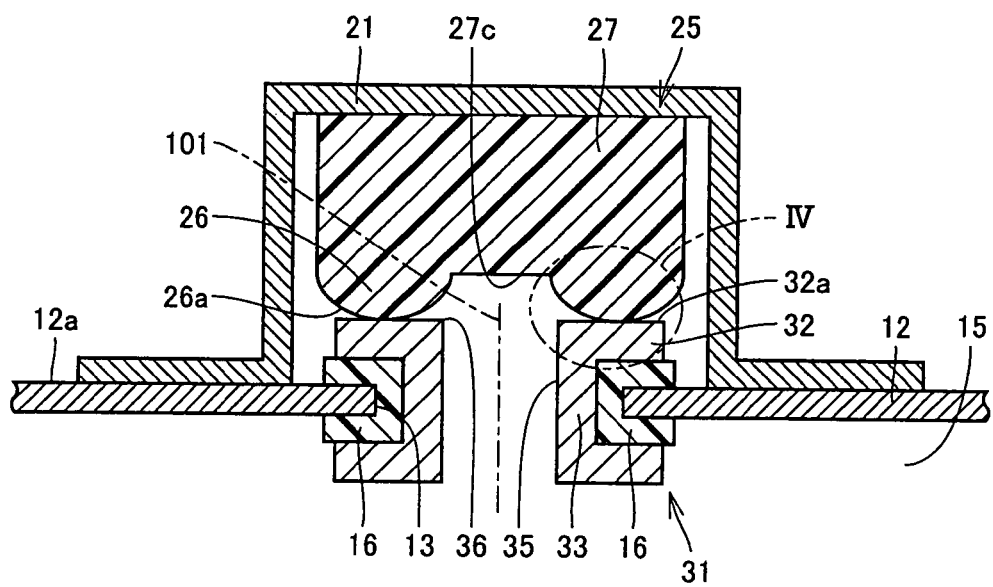
FIG. 2 is a cross-sectional view of the battery cell taken along line II-II in FIG. 1.

In FIG. 2, a cross-sectional view of the battery cell taken along line II-II in FIG. 1 is shown. Referring to FIG. 2, the exhaust mechanism is constituted with a hollow rivet 31 and a seal rubber 25 arranged inside cap 21.

A through-hole 13 opened through surface 12a and communicating with interior space 15 is formed in battery housing case 12. Hollow rivet 31 is fitted in through-hole 13 with an insulating gasket 16 interposed. With such a configuration, hollow rivet 31 is insulated from battery housing case 12 and, as a result, is provided in such a state in that it is floated from both of the negative potential and the positive potential of the battery.

Figure 3:
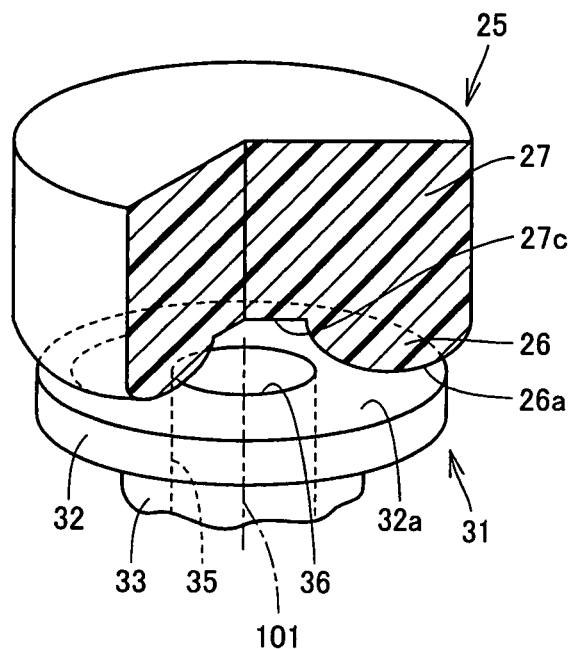
FIG. 3 is a perspective view showing a hollow rivet and a seal rubber in FIG. 2.

In FIG. 3, a perspective view showing the hollow rivet and the seal rubber in FIG. 2 is shown. In the figure, in order to facilitate the understanding of the shape, a part of the seal rubber is represented in cross section. Referring to FIG. 2 and FIG. 3, hollow rivet 31 has a ring-like portion 32 arranged on surface 12a and inside cap 21 and a hollow portion 33 positioned at through-hole 13 and connected to ring-like portion 32.

A seal surface 32a extending parallel to surface 12a is formed in ring-like portion 32. Where the center axis extending in the direction in which through-hole 13 passes through is an axis 101, seal surface 32a is formed to extend annularly in the circumferential direction around axis 101. Here, seal surface 32a is not limited to the shape extending in the circumferential direction of a circle and may have a shape extending in the circumferential direction of an ellipse or an oval or a shape extending along the sides of a polygon such as a quadrangle. An exhaust port 35 extending along axis 101 and opened to an inner edge 36 of seal surface 32a is formed in hollow portion 33. Exhaust port 35 communicates with interior space 15.

Seal rubber 25 is arranged in a compressive deformation state between hollow rivet 31 and cap 21. Seal rubber 25 is compressed and deformed at a ratio (amount of compression) of 20% to 30%. Seal rubber 25 is formed of an elastic body of, for example, butyl rubber, NBR (nitrile rubber), H-NBR (hydrogenated nitrile rubber), or the like.

Seal rubber 25 is constituted with a base portion 27 formed in an approximately cylindrical shape, and an abutment portion 26 positioned between base portion 27 and ring-like portion 32 to pressurize seal surface 32a. Base portion 27 has a bottom surface 27c extending parallel to seal surface 32a on a side facing seal surface 32a. Abutment portion 26 is formed protruding from bottom surface 27c at a position facing seal surface 32a. Abutment portion 26 is formed in such a shape in that a convex portion protruding from bottom surface 27c toward seal surface 32a extends annularly at a position facing seal surface 32a. Abutment portion 26 is formed in contact with seal surface 32a at a position away from inner edge 36 of seal surface 32a. Abutment portion 26 is formed to have a convex shape with respect to seal surface 32a, only at a position in contact with seal surface 32a.

Abutment portion 26 has a surface 26a facing seal surface 32a. If abutment portion 26 is cut across a plane extending in the radial direction of axis 101, surface 26a appears as a curve which is convex with respect to seal surface 32a. Abutment portion 26 is formed such that the distance from bottom surface 27c to surface 26a gradually decreases from the position where abutment portion 26 protrudes most toward the opposite sides of that position.

Figure 4:
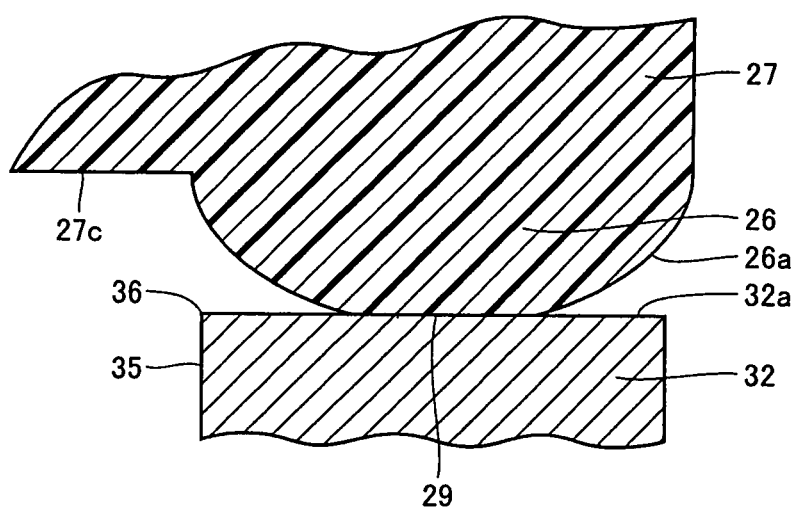
FIG. 4 is an enlarged cross-sectional view of a position surrounded with a chain double-dashed line IV in FIG. 2.

In FIG. 4, an enlarged cross-sectional view of a position surrounded with a chain double-dashed line IV in FIG. 2 is shown. Referring to FIG. 4, abutment portion 26 pressurizes seal surface 32a so that a contact surface 29 is formed on surface 26a. Contact surface 29 extends like a strip along the circumferential direction of seal surface 32a, between inner edge 36 and an outer edge of seal surface 32a. With such a configuration, in the present embodiment, it can be prevented that abutment portion 26 comes in contact with inner edge 36 and a stress concentration occurs at the contact position.

In addition, in a process of manufacturing the exhaust mechanism, when seal rubber 25 is compressed and deformed with cap 21 put on surface 12a, abutment portion 26 first comes in contact with seal surface 32a at a position where it protrudes most from bottom surface 27c. Then, abutment portion 26 becomes deformed around the contact position on the opposite sides thereof while the contact surface with seal surface 32a gradually increases, thereby forming contact surface 29. Therefore, in the present embodiment, even if irregularities exist on seal surface 32a to some extent, abutment portion 26 becomes deformed at contact surface 29 so that a warp does not occur in the direction in which seal surface 32a extends. Thus, seal rubber 25 can be provided in such a state in that surface pressure acts on contact surface 29 more evenly.

For the reasons as described above, in accordance with the present embodiment, degradation of seal rubber 25 can be prevented and an early crack such compression crack in seal rubber 25 can be prevented. Accordingly, the seal between seal surface 32a and abutment portion 26 can be secured over a long time and leakage of the electrolyte from interior space 15 can be prevented.

Furthermore, a supersaturated electrolyte is adhered on the entire surface of hollow rivet 31 in interior space 15. If a battery potential, especially a negative potential is applied to hollow rivet 31 in such a state, the driving force of the electrolyte passing along the surface of hollow rivet 31 toward the contact position between seal surface 32a and abutment portion 26 becomes greater. However, in the present embodiment, hollow rivet 31 is provided floated from the battery potential, so that the driving force of the electrolyte can be reduced. Thus, the amount of the electrolyte leaking from the contact position between seal surface 32a and abutment portion 26 can be kept small.

Figure 5:
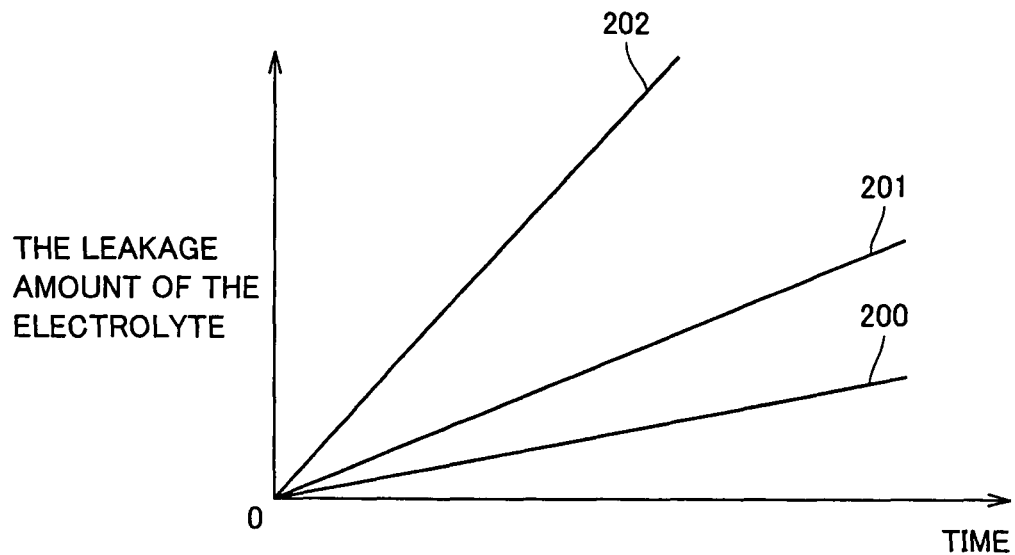
FIG. 5 is a graph illustrating a leakage amount of an electrolyte over time in an example.

Now, a description will be made to an example conducted in order to confirm the effect of the battery cell in the present embodiment. In FIG. 5, a graph illustrating the leakage amount of the electrolyte over time in this example is shown.

Figure 6:
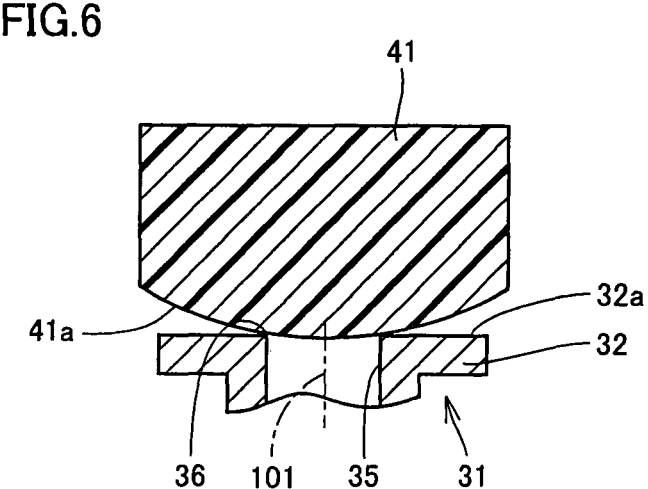
FIG. 6 is a cross-sectional view representing the shape of a seal rubber used in a battery cell for comparison in the example.

In FIG. 6, a cross-sectional view representing the shape of a seal rubber used in a battery cell for comparison in this example is shown.

Referring to FIG. 5 and FIG. 6, in this example, battery cell 10 was placed under the conditions of a temperature of 60° C. and a humidity of 90%, and the leakage amount of the electrolyte over time was measured. The result was represented by a straight line 200 in FIG. 5. Here, the leakage amount of the electrolyte was determined by quantitative analysis of an alkaline component adhered on battery housing case 12.

In addition, for comparison, a battery cell using a seal rubber 41 in FIG. 6 in place of seal rubber 25 was prepared, and the leakage amount of the electrolyte was measured when a positive potential is applied to hollow rivet 31 and when a negative potential is applied. The results were respectively represented by straight lines 201 and 202 in FIG. 5. Seal rubber 41 is formed to protrude most on axis 101, and a surface 41a of seal rubber 41 and inner edge 36 are brought into contact with each other in the state in which seal rubber 41 is compressed and deformed.

As can be understood from the comparison between straight lines 200, 201 and 202, it was confirmed that, in accordance with battery cell 10 in the present embodiment, the leakage amount of the electrolyte can be kept small.

Battery cell 10 as a sealed battery in the first embodiment of the present invention includes battery housing case 12 as a case body forming interior space 15 in which an electrolyte is arranged and having through-hole 13 formed therein to communicate with interior space 15, hollow rivet 31, and seal rubber 25 as an elastic valve body. Hollow rivet 31 has seal surface 32a extending annularly outside battery housing case 12, and hollow portion 33 having exhaust port 35 formed therein to be continuous with inner edge 36 of seal surface 32a and being positioned at through-hole 13, and allows gas in interior space 15 to flow out of exhaust port 35. Seal rubber 25 has abutment portion 26 extending annularly to face seal surface 32a and pressurizing seal surface 32a and is provided to close exhaust port 35. Abutment portion 26 is formed to protrude toward seal surface 32a to be in contact with seal surface 32a at a position away from inner edge 36 of seal surface 32a.

In accordance with battery cell 10 in the first embodiment of the present invention as configured in this manner, leakage of an electrolyte from interior space 15 can be prevented and salting on the surface of battery housing case 12 can be prevented. Thus, the reliability of battery cell 10 can be ensured over a long time. In the present embodiment, since it is premised that battery cell 10 is mounted on a hybrid car and is used for a long time, such an effect is achieved particularly effectively.

In the present embodiment, the description has been made to the case where battery cell 10 is a nickel metal hydride battery. However, the present invention is not limited thereto and may be applied to, for example, a nickel-cadmium battery. In addition, the present invention is not limited to an alkaline battery and may be applied to a lithium-ion battery using a nonaqueous electrolyte.

Second Embodiment

Figure 7:
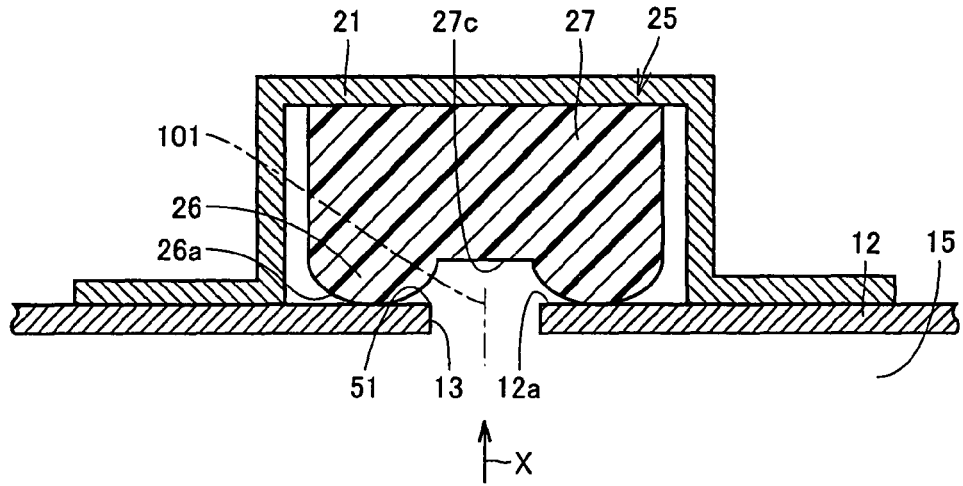
FIG. 7 is a cross-sectional view of a battery cell in a second embodiment of this invention.

FIG. 7 is a cross-sectional view of a battery cell in a second embodiment of the present invention. FIG. 7 is a view corresponding to FIG. 2 in the first embodiment. The battery cell in the present embodiment basically has a similar structure as compared with battery cell 10 in the first embodiment. In the following, description of the overlapping structure will not be repeated.

Referring to FIG. 7, in the present embodiment, hollow rivet 31 and insulating gasket 16 in the first embodiment are not provided.

The exhaust mechanism is formed of seal rubber 25 arranged inside cap 21. Seal rubber 25 is constituted with base portion 27 and abutment portion 26 positioned between base portion 27 and surface 12a to pressurize surface 12a.

Base portion 27 has bottom surface 27c opposing through-hole 13 with a gap and extending parallel to surface 12a. Abutment portion 26 has surface 26a as a convex surface protruding from the peripheral edge of bottom surface 27c toward surface 12a. Abutment portion 26 is formed in such a shape in that a convex portion protruding from bottom surface 27c to surface 12a extends annularly at a position facing surface 12a. In the present embodiment, because of bottom surface 27c opposing through-hole 13 with a gap, seal rubber 25 is shaped to retract from surface 12a at a position where it opposes through-hole 13. In addition, since surface 26a protrudes from the peripheral edge of bottom surface 27c toward surface 12a, surface 26a comes in contact with surface 12a at a position away from an opening edge 51 of through-hole 13. Opening edge 51 is at a position where through-hole 13 is continuous with surface 12a.

If abutment portion 26 is cut across a plane extending in the radial direction of axis 101, surface 26a appears as a curve which is convex with respect to surface 12a. Abutment portion 26 is formed such that the distance from bottom surface 27c to surface 26a gradually decreases from the position where surface 26a protrudes most toward the opposite sides of that position.

The battery cell as a sealed battery in the second embodiment of this invention includes battery housing case 12 as a case body, seal rubber 25 as an elastic valve body, and cap 21 as a cap body. Battery housing case 12 forms interior space 15 having an electrolyte arranged therein and has through-hole 13 formed therein to communicate with interior space 15. Battery housing case 12 allows gas in interior space 15 to flow out through through-hole 13. Seal rubber 25 is provided to close through-hole 13. Cap 21 is fixed to battery housing case 12 and compresses and deforms seal rubber 25 toward battery housing case 12. Battery housing case 12 has surface 12a through which through-hole 13 is opened. Seal rubber 25 has bottom surface 27c opposing through-hole 13 with a gap, and surface 26a as a convex surface protruding from the peripheral edge of bottom surface 27c toward surface 12a. Surface 26a pressurizes surface 12a at a position away from opening edge 51 of through-hole 13.

In accordance with the battery cell in the second embodiment of this invention as configured in this manner, an effect similar to the effect described in the first embodiment can be achieved. In addition, as compared with battery cell 10 in the first embodiment, hollow rivet 31 and insulating gasket 16 are eliminated, so that the manufacturing costs of the battery cell can be reduced.

Figure 8:
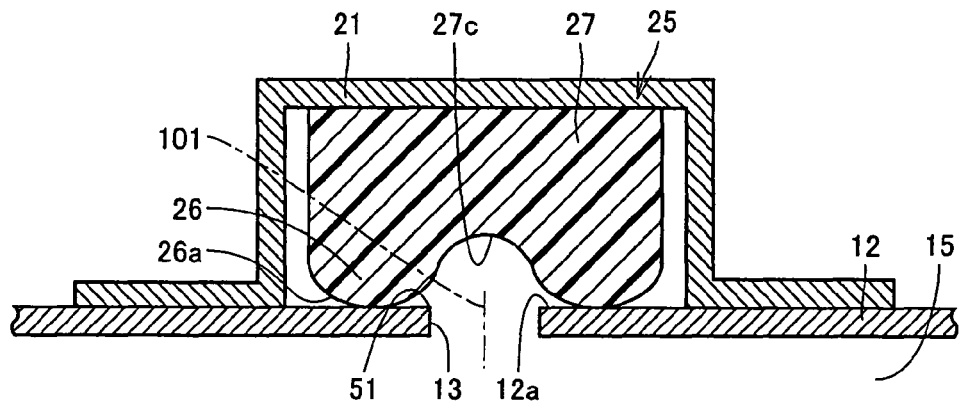
FIG. 8 is a cross-sectional view showing a first modification of the battery cell in FIG. 7.
Figure 9:
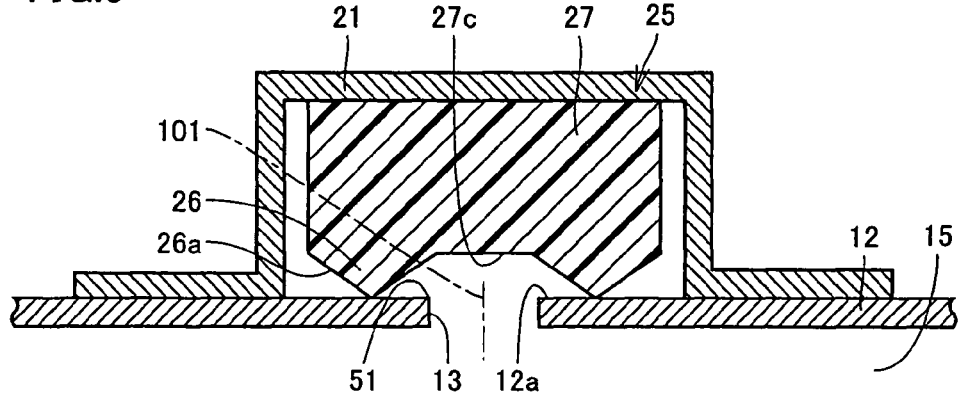
FIG. 9 is a cross-sectional view showing a second modification of the battery cell in FIG. 7.

FIG. 8 is a cross-sectional view showing a first modification of the battery cell in FIG. 7. Referring to FIG. 8, in the present modification, bottom surface 27c is formed of a rounded surface. FIG. 9 is a cross-sectional view showing a second modification of the battery cell in FIG. 7. Referring to FIG. 9, in the present modification, if abutment portion 26 is cut across a plane extending in the radial direction of axis 101, surface 26a has a bent profile which is convex with respect to surface 12a. Even with these configurations, such a manner is achieved in that surface 26a is in contact with surface 12a at a position away from opening edge 51 of through-hole 13, thereby preventing degradation of seal rubber 25.

Figure 10:
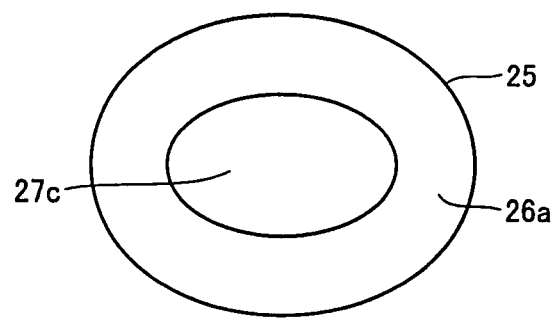
FIG. 10 is a bottom view of a seal rubber showing a third modification of the battery cell in FIG. 7.
Figure 11:
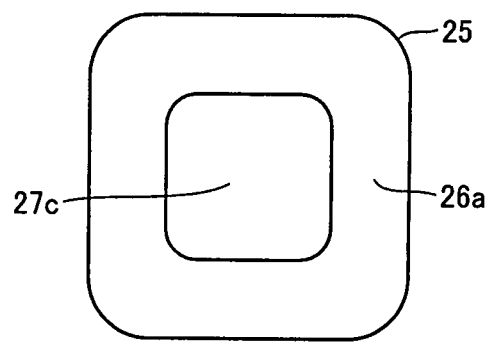
FIG. 11 is a bottom view of a seal rubber showing a fourth modification of the battery cell in FIG. 7.

FIG. 10 is a bottom view of a seal rubber showing a third modification of the battery cell in FIG. 7. FIG. 11 is a bottom view of a seal rubber showing a fourth modification of the battery cell in FIG. 7. In the figures, the seal rubber is shown as viewed from the direction indicated by arrow X in FIG. 7. Referring to FIG. 10 and FIG. 11, the shapes of bottom surface 27c and surface 26a are modified as appropriate according to the shape of through-hole 13. As shown in FIG. 10, bottom surface 27c may be shaped like an ellipse and surface 26c may extend to surround the periphery thereof. As shown in FIG. 11, bottom surface 27c may be shaped like an approximate rectangular and surface 26c may extend to surround the periphery thereof.

The embodiments disclosed herein should be taken as being illustrative rather than limitative in all respects. The scope of the present invention is shown not by the foregoing description but by the claims and it is intended that all equivalents to the claims and modifications within the claims are embraced.

INDUSTRIAL APPLICABILITY

This invention is mainly applied to a sealed battery having an alkaline electrolyte arranged therein, such as a nickel metal hydride battery or a nickel cadmium battery.

The invention claimed is:

1. A sealed battery comprising:
a case body forming an interior space in which an electrolyte is arranged, the case body having a through-hole formed therein that communicates with the interior space, the case body forming a first terminal which is one of a negative terminal and a positive terminal of the sealed battery;
a second terminal which is the other one of the negative terminal and the positive terminal of the sealed battery, the second terminal protruding from the case body and being in non-contact with the case body; and
an exhaust mechanism configured to allow gas in the interior space to flow out through the through-hole, the exhaust mechanism including:
a hollow rivet fitted in the through-hole and having (i) a seal surface extending annularly outside the case body, and (ii) a hollow portion positioned at the through-hole and having an exhaust port formed therein that is continuous with an inner edge of the seal surface, the hollow rivet being electrically isolated from the second terminal;
an insulating gasket fitted in the through-hole so that the insulating gasket is interposed between the case body and the hollow rivet, the insulating gasket insulating the hollow rivet from the case body, the hollow rivet being floated from both a negative battery potential and a positive battery potential of the first and second terminals,
an elastic valve body configured and positioned to close the through-hole by contacting the seal surface of the hollow rivet; and
a cap body fixed to the case body and configured to compress and deform the elastic valve body toward the case body,
wherein the elastic valve body includes a base portion formed in an approximately cylindrical shape and an abutment portion pressed against the seal surface by the cap body, the abutment portion contacting the seal surface at a position away from the inner edge of the seal surface.

2. The sealed battery according to claim 1, wherein
when cut across a plane orthogonal to a direction in which the abutment portion extends annularly, the abutment portion has a profile rounded at a position facing the seal surface.

3. The sealed battery according to claim 1, wherein the abutment portion is annular so as to encircle the exhaust port when pressed against the seal surface by the cap body.

4. The sealed battery according to claim 1, wherein the elastic valve body has a substantially flat top surface without protrusions and depressions, and an entirety of the substantially flat top surface of the elastic valve body contacts the cap body.

\* \* \* \* \*